United States Patent [19]
Schalles

[11] 3,744,125
[45] July 10, 1973

[54] LATHE CHUCK WITH EXCHANGEABLE JAWS AND JAW CHANGING MEANS THEREFOR

[75] Inventor: Erhard Schalles, Ubbedissen, Germany

[73] Assignee: Werkzeugimaschinenfabrik Gildemeister Comp. and Aktiengesellschaft, Bielefeld, Germany

[22] Filed: Jan. 31, 1972

[21] Appl. No.: 221,605

[30] Foreign Application Priority Data
Feb. 3, 1971 Germany............... P 21 04 904.7

[52] U.S. Cl. .................................... 29/568, 82/2.7
[51] Int. Cl. ......................... B23q 3/157, B23b 7/00
[58] Field of Search................. 29/568, 26 A; 214/1 BD; 82/2.5, 2.7

[56] References Cited
UNITED STATES PATENTS
3,028,020  4/1962  Peras .............................. 29/568 X
3,327,386  6/1967  Jerue ................................... 29/568
3,550,487  12/1970  Randall et al........................ 82/2.5

*Primary Examiner*—Travis S. McGehee
*Assistant Examiner*—Z. R. Bilinsky
*Attorney*—Michael S. Striker

[57] ABSTRACT

A program-operated machine tool wherein the housing of a rotary lathe chuck carries three radially movable holders for detachable work-engaging jaws. The jaws can be withdrawn axially of the housing in first positions of the holders and are automatically locked to the holders when the holders are moved to second positions. A shiftable magazine on the frame of the machine tool contains a set of pallets at least some of which support groups of differently dimensioned jaws. A transfer device on the frame is movable between several positions to withdraw an empty pallet from the magazine, to move such pallet into alignment with the chuck housing for reception of jaws from the holders, to thereupon move a pallet with a group of different jaws into alignment with the chuck housing, and to place the jaws thereon into optimum positions for locking to the holders.

26 Claims, 11 Drawing Figures

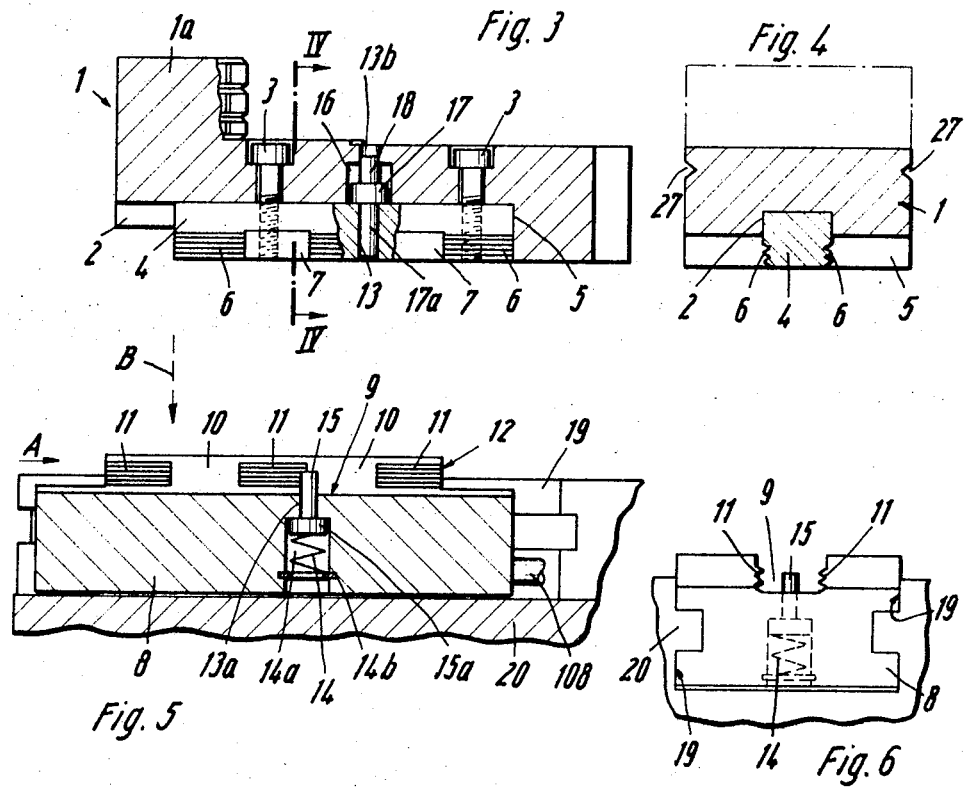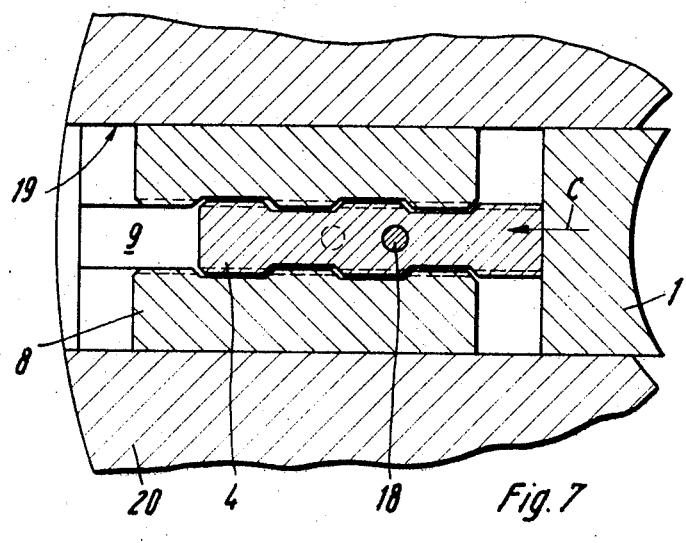

3,744,125

LATHE CHUCK WITH EXCHANGEABLE JAWS AND JAW CHANGING MEANS THEREFOR

BACKGROUND OF THE INVENTION

The present invention relates to machine tools in general, and more particularly to improvements in chucks, such as lathe chucks, which can be utilized in turning machines and/or other types of machine tools to grip and/or rotate workpieces while the workpieces are being treated by one or more tools. Still more particularly, the invention relates to improvements in chucks of the type wherein the work-engaging jaws are detachably secured to preferably power-operated holders so that a previously used set or group of jaws can be replaced with a different group of jaws.

Many recent types of machine tools are provided with programming systems which insure a fully automatic or semiautomatic operation. The use of a programming system brings about substantial savings in time, not only for actual machining of workpieces in a turning machine, lathe or another machine tool but also as regards the insertion, transport and removal of workpieces as well as the movements of tools into and from engagement with articles to be treated. A drawback of presently known program-operated machine tools is that each change in the setup consumes excessive amounts of time with a corresponding reduction in the output. The situation is further aggravated if the setup of a machine tool must be changed at frequent intervals, i.e., if a machine tool is to be used for treatment of relatively small (short) lots of different workpieces so that the tools and/or other parts of the machine tool must be displaced, removed and/or exchanged at frequent intervals. A change in setup often involves replacement of previously used jaws in the chuck or chucks of a machine tool with a different set of jaws or the replacement of the entire chuck or chucks.

The losses in time during each change of setup are even more pronounced if two or more machine tools are combined into a production line with automatic transfer of workpieces between successive machine tools. The programming system for a complete production line is normally designed with a view to insure optimum utilization of all machine tools and to control the movements of various parts in such machine tools as well as the transport of workpieces between successive machine tools in accordance with a preselected schedule. Frequent changes in the setup of a single machine tool in a production line will cause even greater losses in output because the remaining machine tool or tools will remain idle during each interval which is required to change the setup of any given machine tool.

It is already known to construct the programming system for a single machine tool or for an entire production line consisting of two or more operatively connected machine tools in such a way that the programming system initiates, regulates and terminates various operations which must be carried out during a change in the setup of one or more machine tools. As mentioned above, such changes in setup often involve the replacement of one or more chucks.

SUMMARY OF THE INVENTION

An object of the invention is to provide a machine tool with a novel and improved chuck or analogous work holding means which is particularly suited to facilitate rapid and reproducible replacement of certain parts of the chuck with differently dimensioned and/or configurated parts during a programmed change in the setup of the machine tool.

Another object of the invention is to provide a chuck, such as a lathe chuck, with novel and improved jaws and holders for such jaws so that the jaws can be rapidly and conveniently replaced with different groups or sets of jaws if the change in setup of the machine tool employing the chuck necessitates a quick replacement of jaws.

A further object of the invention is to provide a machine tool which embodies the improved chuck with novel and improved means for effecting rapid replacement of jaws with differently dimensioned and/or configurated jaws.

An additional object of the invention is to provide a machine tool, such as a single-spindle turning machine, with a chuck wherein the jaws are readily replaceable and with means for effecting a replacement of jaws without necessitating any attention on the part of the person or persons in charge.

One feature of the invention resides in the provision of a machine tool, particularly a programmed machine tool, which comprises a frame and at least one chuck which includes a housing preferably rotatably supported by the frame (e.g., by the work spindle of a single-spindle turning lathe), a plurality of motion transmitting holders mounted in the housing for movement radially of the housing, and power-operated drive means (such as rack and pinion drives or cylinder and piston assemblies) for moving the holders with reference to the housing. The machine tool further comprises automatic changeover means including a magazine for a plurality of groups of jaws (whereby each such group includes a discrete jaw for each holder of the chuck) and transfer means for transporting selected groups of jaws between the magazine and the housing for attachment of the jaws of a selected group to the holders or for detachment of a group of jaws from the holders and for transport of the thus detached jaws from the holders into the magazine.

The jaws and the holders have complementary coupling elements adapted to separably couple the jaws of a selected group to the holders. The arrangement is preferably such that the coupling elements of the holders engage the jaws of a selected group in response to movement of holders with reference to the housing and with reference to the jaws of the selected group from predetermined first to predetermined second positions. In the first positions of the holders, the jaws of a selected group are movable axially of the housing toward and away from the respective holders. The jaws and the holders further comprise complementary stop means which engage each other in response to movement of holders to their second positions to thereby engage and retain the jaws of a selected group. Furthermore, the chuck is preferably provided with means for automatically locking the jaws of a selected group to the respective holders in response to movement of holders to their second positions. This insures that, once they are locked to the holders, the jaws of a selected group can move with the holders radially inwardly and radially outwardly with reference to the housing.

The magazine may but need not be mounted on the frame of the machine tool and preferably accommodates a supply of carriers in the form of pallets or the like. Each group of jaws is separably mounted on a discrete carrier and the aforementioned transfer means is then designed to transport selected carriers between the magazine and a position of alignment with the housing of the chuck. Each carrier can support a group of differently dimensioned and/or configurated jaws. If a group of jaws is to be detached from the holders, an empty carrier is moved into alignment with the chuck housing and the holders are moved to their first positions to become disengaged from the jaws whereby the jaws adhere to the carrier because the latter may be provided with suitable sockets and detent means for retention of jaws during transport between the housing and the chuck as well as during storage of the respective carrier in the magazine.

The movements of the holders with reference to the housing as well as all movements of the magazine, carriers and transfer means with reference to each other and with reference to the frame of the machine tool can be initiated, regulated and terminated by a suitable programming system so that the replacement of a group of jaws which are connected with the holders by any one of several spare groups of jaws can be carried out in a fully automatic way and within short periods of time to thus insure that the time lost for a change in setup between treatments of different types of workpieces can be reduced to a minimum.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an enlarged longitudinal sectional view of one jaw of a chuck which embodies the invention;

FIG. 4 is a transverse sectional view as seen in the direction of arrows from the line IV—IV of FIG. 3;

FIG. 5 is a fragmentary axial sectional view of the chuck housing and longitudinal sectional view of one of the holders in the housing, the holder being shown in its first position in which it can be coupled with a jaw;

FIG. 6 is an end elevational view as seen in the direction of arrow A shown in FIG. 5;

FIG. 7 is a fragmentary sectional view of the chuck in a plane extending at right angles to its axis, showing one of the holders and one of the jaws in positions they assume prior to movement of the holder to its second position to be thereby coupled to the jaw;

DESCRIPTION OF THE PREFERRED EMBODIMENTS

Figure 1:
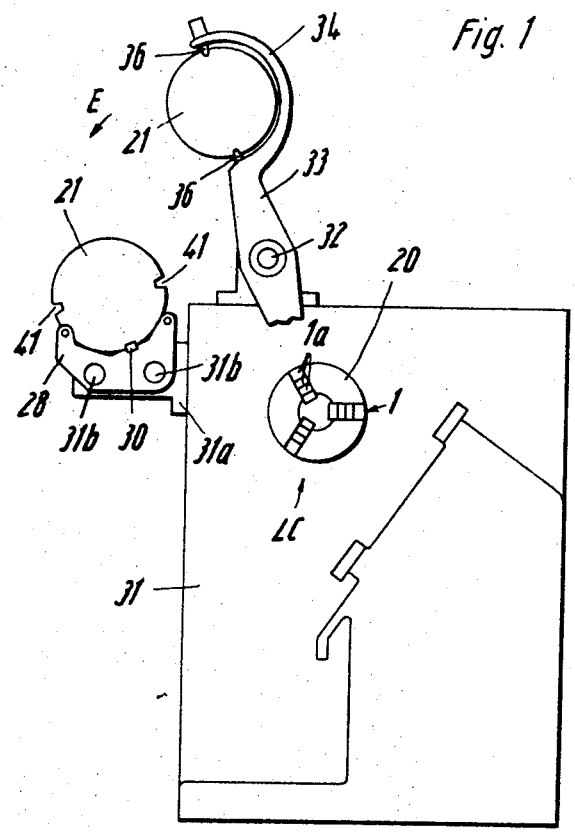
FIG. 1 is a schematic end elevational view of a single-spindle turning machine which embodies the improved chuck and the novel jaw changing means.
Figure 2:
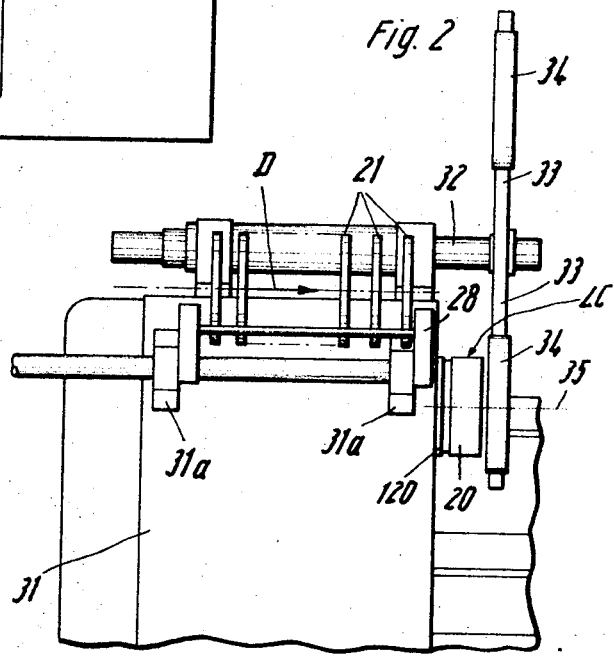
FIG. 2 is a fragmentary side elevational view of the turning machine as seen from the left-hand side of FIG. 1.

Referring first to FIGS. 1 and 2, there is shown a machine tool, e.g., a programmed single-spindle turning machine comprising a frame 31 which supports a rotary spindle 120 having a horizontal axis 35. The nose of the spindle 120 supports a novel lathe chuck LC which comprises a ring-shaped housing 20 accommodating three equidistant radially extending motion transmitting holders 8 one of which is shown in FIGS. 5 and 6. Each holder 8 is movable in a radial slot 19 of the housing 20, and the machine tool comprising drive means (e.g., rack and pinion drives of fluid-operated cylinder and piston assemblies) which can move the holders 8 with reference to the housing 20.

Each holder 8 can be separably coupled to a detachable jaw 1 one of which is illustrated in FIGS. 3 and 4. The jaw 1 of FIGS. 3 and 4 has an underside or inner side which is provided with a lingitudinally extending groove 2 for a spline of feather key 4. The latter is rigidly but separably secured to the body of the jaw 1 by screws 3 or analogous fasteners. The inner end of the groove 2 is bounded by a transversely extending stop face 5. That portion of the key 4 which extends outwardly beyond the groove 2 (see particularly FIG. 4) is provided at both sides with pointed teeth 6 or analogous coupling elements extending in parallelism with the groove 2 and interrupted at a plurality of spaced locations by recesses or notches 7 which are machined into the respective sides of the exposed portion of the key 4. The work-engaging projection of the jaw 1 is indicated at 1a. As shown in FIG. 1, each jaw can be provided with a series of projections 1a not unlike a series of stairs and located at different distances from the axis 35 of the spindle 120.

The holder 8 of FIGS. 5 and 6 has an upper or outer side which is provided with a longitudinally extending groove 9 having a substantially rectangular cross section and serving to receive the exposed portion of the feather key 4 on the attached jaw 1. The surfaces which flank the groove 9 are provided with longitudinally extending pointed teeth 11 (see FIG. 6) complementary to the coupling elements or teeth 6 on the key 4 and interrupted at longitudinally spaced locations by recesses or cutouts 10. A stop face 12 at one end of the groove 9 comes into abutment with the stop face 5 when the jaw 1 of FIG. 3 and 4 is properly attached to the holder 8. The length of recesses 7 in the sides of the exposed portion of the key 4 equals the length of sets of teeth 11 in the groove 9 of the holder 8, and the length of recesses 10 in the holder 8 equals the length of the sets of teeth 6 on the key 4 of the jaw 1. Thus, when the jaw 1 and the holder 8 are oriented in a manner as shown in FIGS. 3 and 5, and the jaw is caused to move sideways as indicated by the arrow B, the sets of teeth 6 on the key 2 will enter the registering recesses 10 of the holder 8 and the recesses 7 of the key 4 will receive the registering sets of teeth 11. If the holder 8 is thereupon moved in the direction indicated by the arrow A shown in FIG. 5, its teeth 11 move into mesh with the adjacent teeth 6 of the jaw 1 and the movement of the holder is terminated when its stop face 12 abuts against the stop face 5 at the inner end of the groove 2 in the underside of the jaw 1. The latter is then held by coupling elements or teeth 6, 11 against any movement in a direction counter to that indicated by the arrow B as well as against movement in a direction counter to that indicated by the arrow A.

The parts 1 and 8 further comprise means for automatically locking the jaw to the holder when the stop face 12 abuts against the stop face 5 so that the jaw is thereupon compelled to share all (radial and orbital) movements of the holder until and unless the locking means is disengaged. As shown in FIGS. 3 and 5, the parts 1 and 8 are respectively provided with holes, sockets or recesses 13, 13a which register with each other when the teeth 6 mate with the teeth 11 and the stop face 12 abuts against the stop face 5. The hole 13 is provided in the key 4 and slidably receives a cylindrical ejector pin 17a having an enlarged portion or boss 17 which is reciprocable within limits in an enlarged hole or chamber 16 of the body of the jaw 1. When the boss 17 abuts against the adjacent inner surface in the chamber 16 of the key 4, the tip of the pin 17a is flush with the exposed surface of the key. The hole 13a of the holder 8 receives a reciprocable locking pin 15 which is provided with an enlarged portion or boss 15a reciprocable within limits in an enlarged hole or chamber 14a of the holder 8 and biased upwardly, as viewed in FIG. 5, by a helical spring 14 reacting against a split ring 14b in the chamber 14a. When the jaw 1 is moved in the direction indicated by the arrow B, the key 4 first depresses the locking pin 15 against the opposition of the spring 14 but the spring is free to expand and to expel a portion of the pin 15 into the hole 13 of the key 4 when the stop face 12 reaches and abuts against the stop face 5, i.e., when the teeth 6 mate with the adjacent teeth 11. The tip of the locking pin 15 then depresses the ejector pin 17a into the hole 13 so that the boss 17 moves away from the adjacent surface in the chamber 16. At the same time, an extention 18 of the ejector pin 17a penetrates deeper into a hole 13b which is machined into the body of the jaw 1 and is open at its outer end, i.e., at that side of the jaw 1 which is exposed when the key 4 is properly coupled to the holder 8. If desired, the extension 18 can be produced as a separate part, as long as it is held against complete ejection from hole 13b. The locking pin 15 is expelled from the hole 13 when the extension 18 is depressed from the exposed side of the jaw 1 so that the ejector pin 17a is compelled to assume the position shown in FIG. 3. The jaw 1 is then movable lengthwise of the groove 9 in the holder 8, or vice versa, so as to place the sets of teeth 6 into register with the recesses 10 whereby the teeth 11 register with recesses 7. The key 4 of the jaw 1 is then ready to be withdrawn from the groove 9 by moving sideways counter to the direction indicated by the arrow B, i.e., in parallelism with the axis of the housing 20.

It is clear that the three-jaw chuck LC of FIGS. 1 and 2 can be replaced with a four-jaw chuck; the housing 20 of the chuck is then provided with four equidistant slots 19 each of which receives a discrete holder 8. As mentioned above, the drive means for moving the holders 8 with reference to the housing 20 may include a rack and pinion drive or a hydraulic or pneumatic cylinder and piston assembly. FIG. 5 illustrates a portion of a piston rod 108 which is connected with the holder 8 and is rigid with a piston in a double-acting hydraulic or pneumatic cylinder to move the holder 8 in and counter to the direction indicated by the arrow A. The valves which regulate the admission and evacuation of a pressurized fluid from the cylinder for the piston of the piston rod 108 are controlled by the programming unit of the machine tool in a manner to be described below.

In accordance with a feature of the invention, the machine tool is provided or associated with changeover means for rapidly replacing or exchanging the set of jaws 1 which are connected to the holders 8 in the slots 19 of the chuck housing 20 with any one of several different sets or groups of jaws. The changeover means comprises a plurality of substantially disk-shaped carriers or pallets 21 each of which can detachably support a group of three jaws 1 in such orientation that the jaws can be coupled with the corresponding holders 8 when the holders assume predetermined positions with reference to the housing 20, namely, the so-called receiving positions corresponding to the position of the holder 8 shown in FIG. 5. In such receiving position, the groove 9 of a holder 8 is ready to receive the exposed portion of the key 4 of one of the chucks 1 which are held on a loaded pallet 21 registering with the housing 20. Thus, all that is necessary is to remove the jaws 1 from the holders 8 of the chuck LC shown in FIGS. 1 and 2 and to thereupon move a pallet 21 with three differently dimensioned and/or configurated jaws 1 into register with the housing 20. In the next step, the selected pallet 21 is moved in the direction of the axis 35 so that the teeth 6 of the key 4 on the jaws 1 carried by the pallet 21 enter the recesses 10 of the respective holders 8. The holders are then moved lengthwise (arrow A in FIG. 5) so that the teeth 11 move into mesh with the teeth 6 and the jaws 1 are automatically locked to the respective holders 8 (by the pins 15) when the stop faces 12 of the holders 8 engage the stop faces 5 on the respective jaws 1.

As shown in FIGS. 8 to 11, each pallet 21 has a circular outline and is provided with three sockets 23 for reception of projections 12 on a group of jaws 1. When the projections 1a of a group of jaws 1 are received in the sockets 23 of a pallet 21, the positions of the jaws 1 on the pallet are properly determined to allow for entry of teeth 6 on the keys 4 of such jaws into the recesses 10 of the holders 8 in the housing 20 when the selected pallet 21 is placed into register with and moves axially toward the housing 20. Each pallet 21 is further provided with three pairs of radially extending parallel guide rails 22 best shown in FIG. 9. The rails 22 serve to further insure proper orientation of jaws 1 during storage on a pallet 21 as well as during transport into register with and axially toward the housing 20. The sides of the body of each jaw 1 are provided with longitudinally extending notches 27 of triangular outline (see FIGS. 4, 8, 10 and 11) for reception of spherical detent elements 24 which are biased by helical springs 24a and partially extend into the adjoining notches 27 when a jaw 1 is properly mounted on the pallet 21 so that its projection or projections 1a extend into the respective socket 23 and its body is located between the corresponding guide rails 22. The surfaces 26 surrounding the sockets 23 engage the projections 1a of the respective jaws 1 (see FIG. 10) when the jaws abut against the surface 25 of the pallet 21 whereby the jaws are held by detent elements 24 in optimum positions for transfer onto the holders 8 in the housing 20. The detent elements 24 and the springs 24a are mounted in the guide rails 22 in a manner shown in FIG. 11. The bias of the springs 24a suffices to prevent undesirable movements of jaws 1 during storage on the pallets 21 as well as during transport of such pallets from the chuck LC to a magazine 28 (FIGS. 1 and 2) as well as from the magazine 28 into alignment with and thereupon axially toward the housing 20.

The magazine 28 is mounted on the frame 31 of the machine tool for movement in parallelism with the axis 35 of the spindle 120. This magazine is long enough to accommodate a requisite number of pallets 21 which can be removably received in discrete compartments so as to be readily lifted above and reinserted into the magazine (see the arrow E of FIG. 1 which indicates the direction in which a pallet 21 can be inserted into a selected compartment of the magazine 28). The peripheral surface of each pallet 21 is provided with a socket 29 (see FIGS. 9 and 10) which can receive a portion of a longitudinally extending locating bar 30 (FIG. 1) in the magazine 28. When the bar 30 extends into the socket 29 of a freshly inserted pallet 21, the latter is properly oriented for withdrawal from the magazine 28 and for transport into alignment with the housing 20.

FIGS. 1 and 2 further show that the frame 31 is provided with two spaced brackets 31a which support two tie rods 31b along which the magazine 28 is shiftable lengthwise between a plurality of positions so as to place a selected pallet 21 into register with a transfer mechanism which serves to transport the pallets between the magazine and a position of alignment with the housing 20, as well as axially toward and away from the housing 20. The transfer mechanism comprises a two-armed transfer member 33 which is pivotable on a shaft 32 parallel with the spindle 120 and mounted on the frame 31. The end portion of each arm of the transfer member 33 is provided with an arcuate (preferably substantially semicircular) gripper 34 having two radially inwardly extending projections or fingers 36 located diametrically opposite each other. The fingers 36 can enter recesses or notches 41 provided in the peripheral surface of each pallet 21 (see FIG. 9). These fingers are retractable so that they can deposit a pallet 21 into the magazine 28 to be thereupon separated from the thus deposited pallet whereby the latter remains in the selected compartment of the magazine.

In order to facilitate automatic removal of selected pallets 21 from the magazine 28 and reinsertion of pallets into preselected compartments of the magazine, the pallets and/or the compartments are provided with encoded information which can be readily located by automatic scanning or tracking elements of the programming system. When an empty pallet 21 is to be withdrawn from the magazine 28, the latter is shifted lengthwise (see the arrow D in FIG. 2) until the selected empty pallet 21 moves into register with the grippers 34 of the transfer member 33. The member 33 is then pivoted in a counterclockwise direction (see the arrow E in FIG. 1) whereby the fingers 36 of the oncoming gripper 34 snap into the notches 41 of the empty pallet 21. The transfer member 33 is thereupon pivoted counter to the direction indicated by the arrow E so that the fingers 36 remove the empty pallet 21 from the magazine 28, and the magazine 28 is retracted counter to the direction indicated by the arrow D of FIG. 2 so that it is moved out of the way. Therefore, the transfer member 33 is free to pivot (arrow E in FIG. 1) to such an extent that the empty pallet 21 carried by the fingers 36 of one of its grippers 34 moves into alignment with the housing 20 of the chuck LC. In the next step, the shaft 32 is caused to move axially and to transport the empty pallet 21 into immediate proximity of the housing 20. Prior to such axial movement of the empty pallet 21, an indexing mechanism (not specifically shown) must be actuated by the programming system of the machine tool to move the housing 20 of the chuck LC to any one of three predetermined angular positions in which the jaws 1 on the holders 8 in the housing 20 register with the pairs of guide rails 22 on the empty pallet 21. Consequently, as the pallet 21 moves axially toward the housing 20, the projections 1a of the jaws 1 enter the sockets 23 and the detent elements 24 snap into the respective notches 27 of the adjoining jaws whereby the jaws are separably but securely coupled to the pallet 21.

Each pallet 21 carries a disengaging means including three shifting pins 37 (see FIG. 8) which engage the extensions 18 when an empty pallet moves axially toward the housing 20. The shifting pins 27 are biased by helical springs 38 which are weaker than the springs 14. Therefore, as an empty pallet 21 approaches the housing 20, the extensions 18 depress the shifting pins 37 until the trailing ends of the pins 37 strike against fixed abutments 39 provided on the pallet 21. The abutments 39 thereupon prevent further depression of shifting pins 37 while the empty pallet 21 continues to move axially toward the housing 20. Consequently, the pins 37 move the aligned extensions 18 against the opposition of the springs 14 so that the ejector pins 17a expel the corresponding locking pins 15 from the holes 13 of the keys 4 by assuming the positions corresponding to that shown for the ejector pin 17a of FIG. 3. This terminates the locking action so that the piston rods 108 can displace the holders 8 in directions (see the arrow C of FIG. 7) to move the stop faces 12 of the holders 8 away from the stop faces 5 on the respective jaws 1 (namely, in directions counter to that indicated by the arrow A of FIG. 5). The holders 8 are arrested when their recesses 10 register with the sets of teeth 6 on the respective jaws 1. Since the detent elements 24 already extend into the notches 27 of the jaws 1, a subsequent movement of the pallet 21 axially of and away from the housing 20 results in detachment of the jaws 1 from the holders 8. The jaws 1 cannot share the movements of the holders 8 under the action of the piston rods 108 because their projections 1a extend into the sockets 23 of the pallet 21.

In the next step, the magazine 28 is again moved lengthwise as indicated by the arrow D of FIG. 2 so that the other gripper 34 of the transfer member 33 can engage a preselected loaded pallet 21 in response to a counterclockwise pivoting of the member 33 (arrow E of FIG. 1). The loaded pallet 21 which registers with the empty gripper 34 carries that group of jaws 1 which is to be attached and locked to the holders 8 in the housing 20. The magazine 28 is retracted after the selected loaded pallet 21 is removed from the corresponding compartment in response to clockwise pivoting of the transfer member 33 (counter to the direction indicated by the arrow E). Consequently, the member 33 is free to pivot in the direction of arrow E so as to place the freshly withdrawn loaded pallet 21 into alignment with the housing 20. The shaft 32 is then moved axially to advance the loaded pallet 21 toward the housing 20 whereby the sets of teeth 6 on the jaws 1 of such loaded pallet automatically enter the recesses 10 of the corresponding holders 8. The piston rods 108 thereupon move the holders 8 in directions to advance their stop faces 12 into engagement with the stop faces 5 of the respective jaws 1 on the loaded pallet 21. The pallet is thereupon moved axially of and away from the housing 20 but the jaws 1 cannot share such movement because their teeth 6 mate with the teeth 11 of the respective holders 8. Therefore, the detent elements 24 are caused to leave the respective notches 27 and, as the pallet 21 moves away from the housing 20, the shifting pins 37 move away from the respective extensions 17. Thus, the springs 14 are free to expand and to propel the locking pins 15 into the holes 13 of the respective keys 4 so as to lock the jaws 1 to the respective holders 8.

Figure 8:
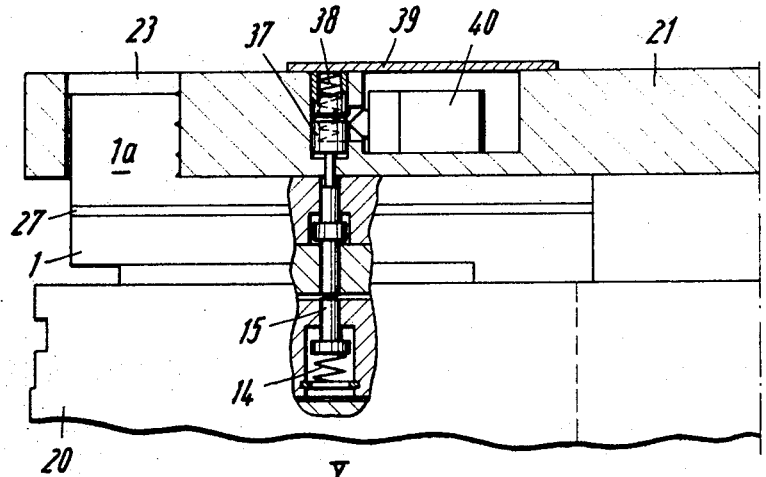
FIG. 8 is a fragmentary partly elevational and partly sectional view of the chuck, further showing in section a portion of a carrier which is about to transfer a set of jaws to the holders or to remove a set of jaws for transport into the magazine.
Figure 9:
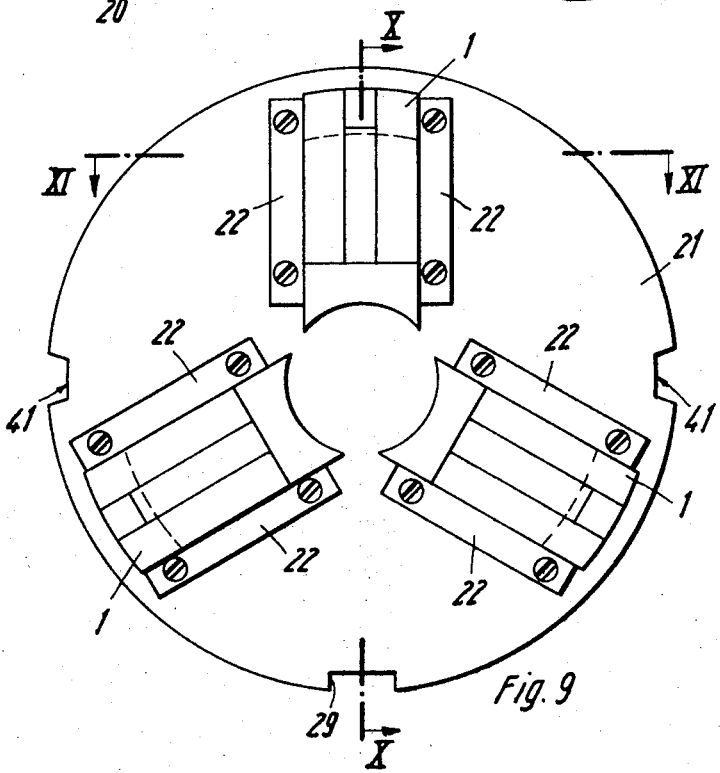
FIG. 9 is an end elevational view of a carrier.
Figure 10:
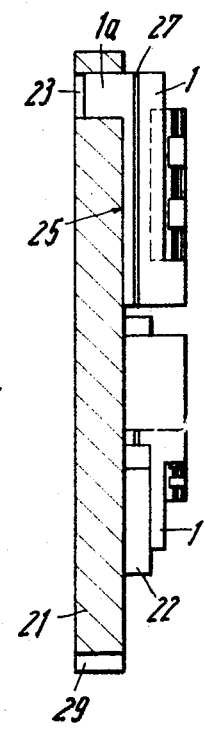
FIG. 10 is a sectional view as seen in the direction of arrows from the line X—X of FIG. 9.
Figure 11:
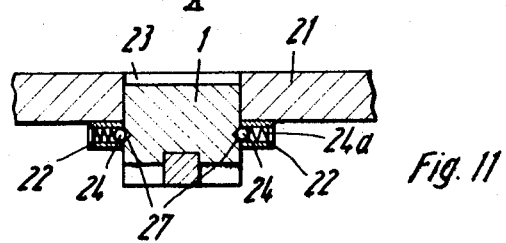
FIG. 11 is a fragmentary sectional view as seen in the direction of arrows from the line XI—XI of FIG. 9.

The switches 40 (one of which is shown in FIG. 8) serve as a signal generating means to indicate the condition of the disengaging means on the pallets 21, i.e., to produce signals when the shifting pins 37 assume their normal positions (namely, when a set of jaws 1 has been transferred from a loaded pallet 21 onto the holders 8). Such signals are transmitted to the programming system to indicate proper attachment of a fresh group of jaws 1 to the holders 8.

The aforedescribed sequences of steps which must be carried out by the magazine 28, transfer member 33, shaft 32, piston rods 108 and the indexing mechanism for the housing 20 of the chuck LC are started and controlled by the programming system so that the detachment of a previously used group of jaws 1 and the attachment of a fresh group of jaws can be carried out without any assistance on the part of the attendants.

It is further clear that the improved machine tool is susceptible of many additional modifications without departing from the spirit of the invention. For example, the projections 1a of the jaws 1 can be designed to engage the internal surface of a tubular workpiece. Since the transfer of motion from the holders 8 to the properly attached jaws 1 takes place by way of the stop faces 5 and 12, all that is necessary to modify the illustrated chuck LC for use with jaws which engage a tubular workpiece from within is to dispose the stop faces 5 and 12 in such a way that the stop face 12 of each holder 8 will move toward the stop face 5 of a jaw 1 thereon when the respective holder moves counter to the direction indicated by the arrow A of FIG. 5. A properly locked jaw 1 will then engage the internal surface of a workpiece while the corresponding holder 8 moves radially outwardly away from the axis 35 of the spindle 120.

The sets of pointed teeth 6 and 11 of the jaws 1 and holders 8 can be replaced by ribs or otherwise configurated coupling elements. Also the keys 4 can constitute integral portions of the respective jaws 1.

The magazine 28 can be movably mounted on a separate support which can be installed adjacent to the frame 31. Also, the carriers or pallets 21 can be omitted if the magazine can store groups of jaws in predetermined positions and if the transfer means including the parts 32, 33, 34, 36 is designed to carry groups of jaws which are not separably secured to a carrier. For example, each arm of the member 33 can be provided with a gripper resembling an empty carrier 21.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a machine tool, particularly in a program-operated machine tool, a combination comprising a frame; a chuck including a housing supported by said frame, a plurality of holders radially movably mounted in said housing, and power-operated means for moving said holders; and automatic changeover means including a magazine for a plurality of groups of jaws, each such group including a discrete jaw for each of said holders, and transfer means for transporting selected groups of jaws between said magazine and said housing for attachment of the jaws of a selected group to said holders or for detachment of a group of jaws from said holders and for the transport of detached jaws into said magazine, said jaws and said holders having complementary coupling elements adapted to separably couple the jaws of a selected group to said holders.

2. A combination as defined in claim 1, wherein said magazine is movably supported by said frame.

3. A combination as defined in claim 1, wherein said changeover means further comprises a supply of carriers in said magazine and each of said groups of jaws is separably supported by one of said carriers, said transfer means being arranged to transport said groups of jaws together with the respective carriers and at least some of said groups containing differently dimensioned jaws.

4. A combination as defined in claim 1, wherein said housing is rotatably supported by said frame, and coupling elements of said holders being arranged to engage with the complementary coupling elements of a selected group of jaws in response to movement of said holders with reference to said housing and the selected groups of jaws from first to second predetermined positions.

5. A combination as defined in claim 4, wherein said holders and said jaws further comprise complementary stop means whereby the stop means of said holders abut against the stop means of a selected group of jaws in said second predetermined positions of said holders.

6. A combination as defined in claim 5, wherein each of said jaws comprises an elongated key which is provided with the respective coupling elements and with the respective socket means.

7. A combination as defined in claim 4, wherein said chuck further comprises means for automatically locking the jaws of a selected group to the respective holders in response to movement of said holders to said second positions.

8. A combination as defined in claim 4, wherein each of said holders has an outer surface provided with a groove extending radially of said housing and each of said jaws comprises a portion which is insertable into and withdrawable from the groove of the respective holder in said first position of such holder by moving the jaw axially of said housing.

9. A combination as defined in claim 8, wherein each of said grooves has a substantially rectangular cross-sectional outline.

10. A combination as defined in claim 8, wherein said coupling elements are provided on said portions of said jaws and in said grooves of said holders and include at least one first set of protuberances on each of said portions and at least one second set of protuberances in each of said grooves, the protuberances of each first set mating with the protuberances of the respective second set in response to movement of said holders from said first to said second positions.

11. A combination as defined in claim 10, wherein said protuberances are teeth extending radially of said housing.

12. A combination as defined in claim 4, wherein said chuck further comprises means for automatically locking the jaws of a selected group to the respective holders in response to movement of said holders to said second positions, including spring-biased locking members provided in said holders and arranged to extend into socket means provided therefor in the respective jaws in response to movement of said holders to said second positions.

13. A combination as defined in claim 12, wherein each of said jaws further comprises ejector means actuatable to expel from the respective socket means the locking member of the corresponding holder and to thereby free such holder for movement from said second to said first position.

14. A combination as defined in claim 13, wherein said locking members are reciprocable in the respective holders in parallelism with the axis of said housing and said ejector means are reciprocable in said jaws and register with the respective locking members in the second positions of said holders.

15. A combination as defined in claim 3, wherein said transfer means is arranged to transport carriers with selected groups of jaws between said magazine and a position of alignment with said housing for attachment of the jaws on a thus transported carrier to said holders subsequent to detachment of a previously utilized group of jaws from such holders.

16. A combination as defined in claim 15, wherein said magazine and said transfer means are movably mounted on said frame.

17. A combination as defined in claim 15, wherein said housing is rotatable relative to said frame and said magazine is movable in substantial parallelism with the axis of said housing to place a selected carrier therein into register with said transfer means.

18. A combination as defined in claim 15, wherein said housing is rotatable relative to said frame and said transfer means comprises a shaft extending in parallelism with the axis of said housing, a transfer member mounted on said shaft for lengthwise and angular movement, and a plurality of carrier-engaging grippers provided on said transfer member.

19. A combination as defined in claim 18, wherein each of said carriers has a substantially circular outline and is provided with a pair of peripheral recesses located substantially diametrically opposite each other, each of said grippers being of arcuate shape and having a pair of projections receivable in the recesses of a selected carrier in said magazine to thereby releasably secure such carrier to the respective gripper.

20. A combination as defined in claim 15, wherein the number of said holders exceeds two and said holders are equidistant from each other, each of said carriers comprising a plurality of equidistant sockets for portions of the group of jaws thereon, and guide means for maintaining the jaws thereon in such orientation that each jaw registers with one of said holders when the corresponding carrier is moved into alignment with said housing.

21. A combination as defined in claim 20, wherein said number is three.

22. A combination as defined in claim 20, wherein said guide means is provided with detent means for releasably engaging the jaws on the respective carrier.

23. A combination as defined in claim 22, wherein said guide means comprises a pair of rails for each jaw on the respective carrier and said detent means comprises spring-biased detent members provided in at least one of each of said pairs of rails and normally extending into notches provided therefor in said jaws.

24. A combination as defined in claim 15, wherein said chuck further comprises means for releasably locking the jaws of a selected group to said holders in response to movement of said holders to said second positions, each of said carriers comprising means for disengaging said locking means in response to movement of an empty carrier axially toward said housing so that the jaws supported by said holders can be separated from the holders in response to movement of such holders to said first positions.

25. A combination as defined in claim 24, wherein said locking means comprises spring-biased locking members reciprocably mounted in said holders and extending into recesses provided therefor in adjacent jaws in response to movement of said holders to said second positions, said disengaging means comprising spring-biased shifting members reciprocably mounted in each of said carriers and arranged to expel said locking members from said recesses in response to axial movement of an empty carrier toward said housing.

26. A combination as defined in claim 24, wherein each of said carriers comprises signal generating means for indicating the condition of the respective disengaging means.

* * * * *